No. 852,001. PATENTED APR. 30, 1907.
R. H. SMITH.
SHOCK ABSORBER.
APPLICATION FILED MAR. 6, 1906.

Witnesses:

Inventor:
R H Smith,
By his attorney
J. H. Richards

UNITED STATES PATENT OFFICE.

RUDOLPH H. SMITH, OF ENGLEWOOD, NEW JERSEY.

SHOCK-ABSORBER.

No. 852,001.

Specification of Letters Patent.

Patented April 30, 1907.

Application filed March 6, 1906. Serial No. 304,438.

*To all whom it may concern:*

Be it known that I, RUDOLPH H. SMITH, a citizen of the United States, residing in Englewood, in the county of Bergen and State of New Jersey, have invented certain new and useful Improvements in Shock-Absorbers, of which the following is a specification.

This invention relates to shock absorbers, and more particularly to the application of the resistance to vehicle springs in such manner that the spring movement in each direction is resisted by both compression and expansion springs.

Figure 1:
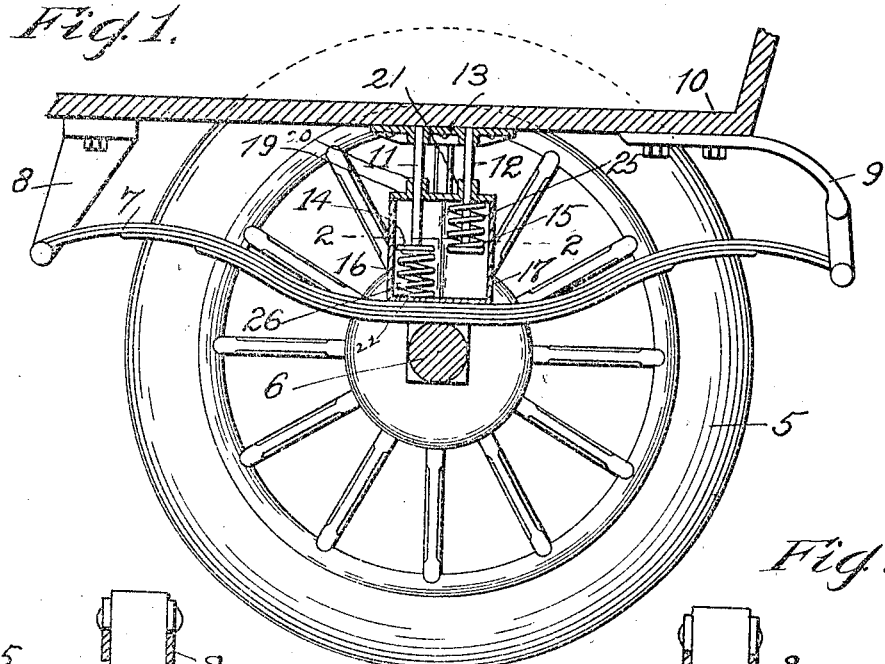
Figure 2:
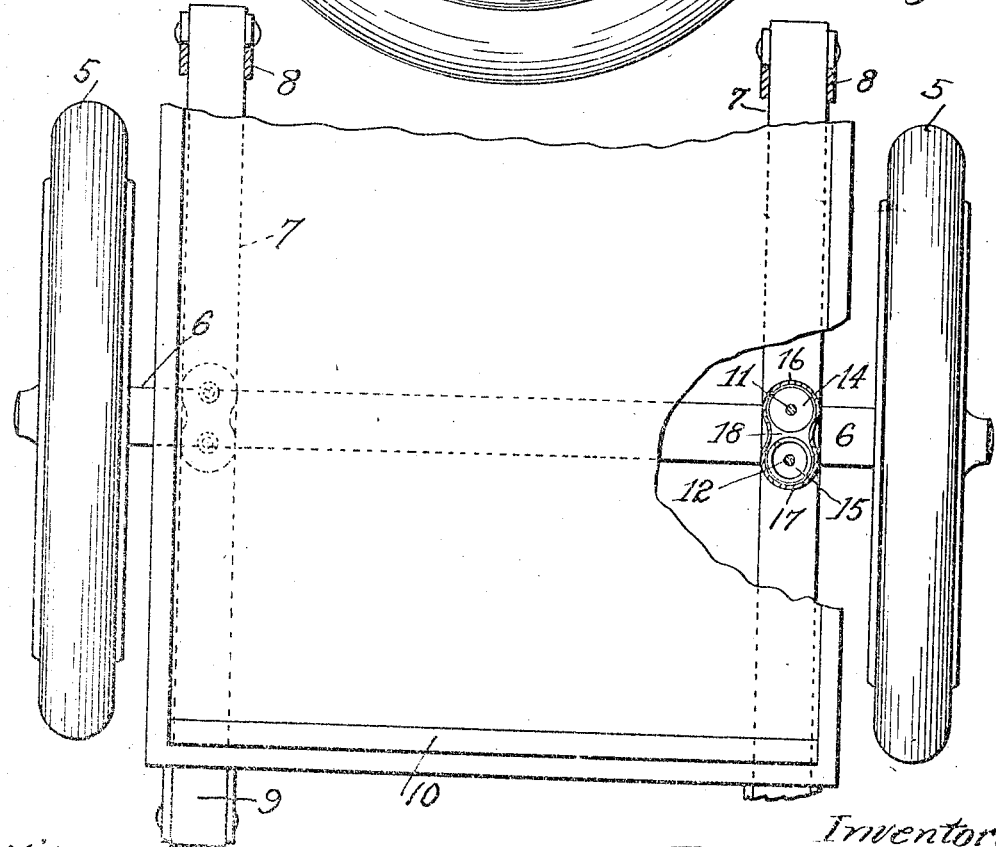

In the drawings accompanying and forming a part of this specification Figure 1 is a longitudinal vertical section of a portion of a wheeled vehicle provided with a form of my present improvement. Fig. 2 is a plan view of a portion of a similar vehicle, it being shown in different horizontal planes for the purpose of exhibiting different parts of the structure, and a portion thereof is taken upon the line 2—2 of Fig. 1.

In the illustration herein there is a wheel 5 mounted upon an axle 6, which axle is connected by means of a spring 7 and suitable hangers 8—9 with a vehicle body 10. As is well known the rapid movement and recoil of springs of vehicles, particularly automobiles, is undesirable, not only on the score of comfort, but also because the springs in certain rapid movements are liable to break. My present improvement embodies mechanism whereby the movements in the opposite directions will respectively compress and extend the resistance springs.

A pair of rods 11 and 12 are secured in the present instance to the vehicle body 10 by means of some suitable face or plate 13.
The rods project toward the axle, and in the present instance are of equal length and provided with heads 14—15 respectively. The rods are shown as projecting within cylinders, there being provided a pair of cylinders 16 and 17 each of which is open down one side and the two open sides connected together, thereby forming an intercommunicating passage 18 of substantially the length of the cylinders, thus making a case in which the heads of the rods 11 and 12 are located. The cylinders are provided with a head 19 having guides 20 and 21 for the rods. This guiding will assist in preventing the independent movement of the axle and body.
A coiled spring 25 is interposed between the upper side of the rod head 15 and the casing head 19, which constitutes an abutment above the said head, and secured to the axle, and the spring is secured to each of these so that upon the movement apart of the body and axle the spring will be compressed and upon their relative movement toward each other the spring will be extended. A spring 26 is placed between the lower side of the head 14 and the axle, that is in the present showing it rests on the bottom of the casing, so that upon the downward movement or the relative movement of the body toward the axle the spring will be compressed and the spring being fastened to the head 14 and the bottom head 22 of the casing upon the upward movement of the vehicle body or its relative movement away from the axle the spring will be extended, thus it will be seen that each of the vehicle springs is provided with a pair of resistant springs, one of which will act as a compression spring and the other as an extension spring when the body and axle move either toward or away from each other.

The special utility of the casing embodying the resistance springs is to prevent accumulations of dust and dirt upon such springs, and also to prevent pebbles and small pieces of stone finding lodgment between the springs and impairing their action as well as injuring them. It will be seen that both springs are securely housed within a single housing structure, and one which does not occupy any more room than is necessary for the accommodation of the parts housed.

Having described my invention I claim:

1. A shock absorber embodying a casing and a pair of rods secured to the axle and the vehicle body respectively, and a pair of coiled springs within said casing and secured to the same and to said rods whereby these will be respectively compressed and extended upon the respective relative movements of the body and axle toward and from each other.

2. The combination with a cylinder, of a pair of pistons projecting into the same, said cylinder and pistons secured to the axle and vehicle respectively, a coil extension and compression spring secured to each piston and arranged so that one of these will be compressed and the other extended upon the relative movement of the axle from the body and one will be extended and the other compressed upon the relative movement of the axle toward the body.

3. In a vehicle embodying a body and an axle and a spring connecting these, the combination with an abutment connected to the axle, of a pair of heads secured to the body, a coil spring below one of these and between the same and the axle and secured thereto and to the axle, and a coil spring above the other of these and between the same and said abutment and secured thereto and to said abutment, the organization being such that each coil spring will be compressed when the other is extended.

4. In a vehicle having a body and an axle connected by a spring, the combination with a double intercommunicating cylinder carried by the axle, a pair of rods carried by the body and extending into the cylinder and being provided with heads located therein, a spring between one head and the top of the cylinder, and a spring between the other head and the bottom of the cylinder, said springs being connected to the cylinder and to said heads so that movement in opposite directions will respectively compress and expand the coiled springs.

5. The combination with a vehicle embodying an axle and a body, of a pair of rods carried by one of these, a pair of open side cylinders joined to one another at their open sides and producing an intercommunication between substantially their entire length, a coiled spring located in each of said cylinders, one of said rods extending into each of said cylinders and engaging the spring therein for compressing and extending the same upon opposite relative movements of the body and axle respectively.

Signed at Nos. 9 to 15 Murray street, New York, New York, this 3d day of March, 1906.

RUDOLPH H. SMITH.

Witnesses:
CHAS. LYON RUSSELL,
FRED. J. DOLE.